United States Patent Office 3,518,678
Patented June 30, 1970

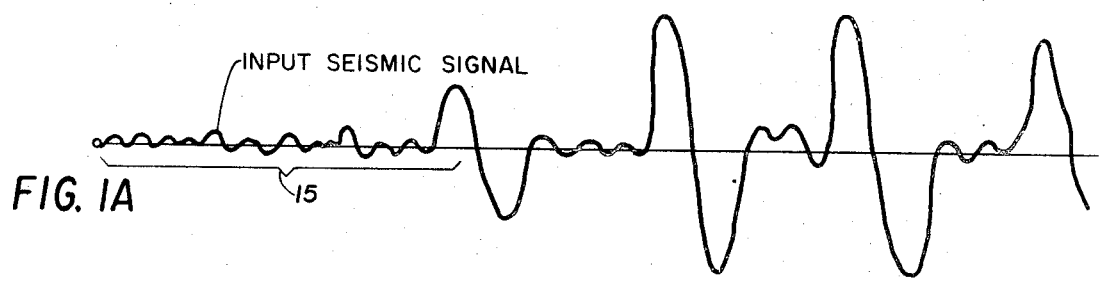
FIG. 1A
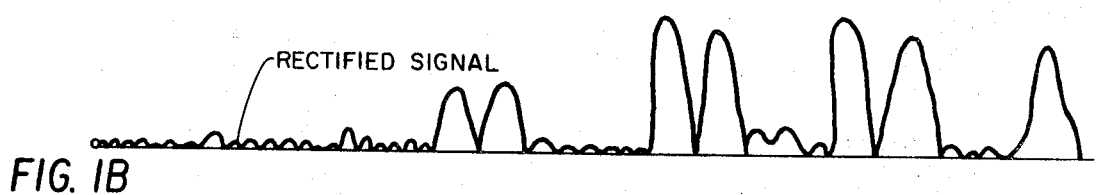
FIG. 1B
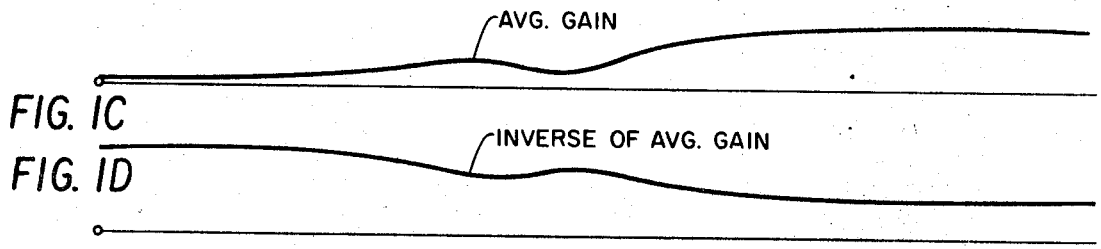
FIG. 1C
FIG. 1D
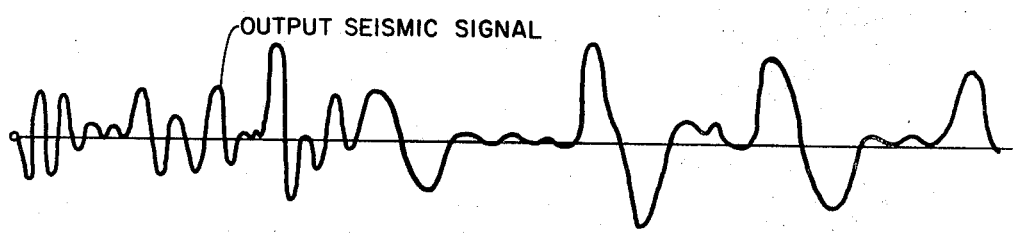
FIG. 1E
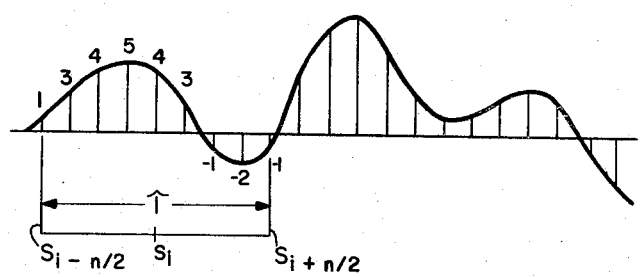
FIG. 7

3,518,678
METHOD OF DYNAMICALLY EQUALIZING THE GAIN OF SEISMIC SIGNALS
Philip L. Lawrence and Jack T. Nipper, Dallas, Tex., assignors to Mobil Oil Corporation, a corporation of New York
Continuation of application Ser. No. 656,722, July 28, 1967. This application Nov. 5, 1968, Ser. No. 780,306
Int. Cl. G01v 1/28
U.S. Cl. 340—15.5                                    2 Claims

ABSTRACT OF THE DISCLOSURE

The specification discloses a method of dynamically equilizing a recorded seismic signal for variations in gain other than those due to subsurface geology. First, there is generated a control function representative of a moving average or other smoothed version of the absolute value of a seismic signal to be equalized. Then the amplitude of this seismic signal is dynamically adjusted by amounts related to the inverse of the generated control function. Both analog and digital techniques of implementing the method are disclosed.

---

This application is a continuation of Ser. No. 656,772, filed July 28, 1967, now abandoned.

BACKGROUND OF THE INVENTION

Field of the invention

This invention relates to geophysical prospecting utilizing the seismic technique and, more particularly, to a method for processing a recorded seismic signal or trace to eliminate or reduce its gain variations other than those due to subsurface geology.

Description of the prior art

In seismic prospecting there are many causes of variations in amplitude of the traces of a seismogram in addition to the variations due to the geologic substratum of the earth. Some of these causes are static or constant throughout the duration of a seismogram trace, and thus result in only gain differences among traces. For example, where an explosive charge is used as the input or shot pulse applied to the earth, variations in charge size between each recording may cause static gain variations among traces of seismograms recorded following different explosive charges. Other sources of static gain variation include differences in geophone sensitivity and recording amplifier gain settings.

Still other causes of gain variations unrelated to subsurface geology produce dynamic variations in seismogram traces. Some of these causes are: (a) the use of an improper programmed gain control in the field recording amplifiers; (b) the use of improper automatic volume control (AVC) in the field recording amplifiers (e.g. AVC having too long a time constant); and (c) processing techniques that are applied in data processing centers. Unless the seismic traces are compensated for both static and dynamic gain variations, valuable data may be lost.

The prior art has provided only a method for eliminating or reducing the static variations in average amplitude between seismogram traces—not dynamic variations within the same trace. U.S. Pat. 3,275,982, issued to C. W. Bogs et al. on Sept. 27, 1966, describes a method and apparatus for eliminating these static gain variations. The method disclosed in this patent includes reproducing a seismogram trace as an electrical signal on two successive cycles. On the first reproduction cycle an electrical control signal is produced, having an amplitude that is indicative of the average value of a characteristic of the reproduced signal that is variable as a result of variations in detecting and recording parameters. This electrical control signal may be related to the total energy or the average amplitude throughout the trace. On the second reproduction cycle the electrical control signal derived during the first reproduction cycle is used to control the amplification of the reproduced electrical signal by a constant amount that is an inverse function of the control signal.

SUMMARY OF THE INVENTION

This invention provides a method of equalizing a recorded seismic signal for both static and dynamic variations other than those due to subsurface geology. The invention is particularly useful in processing seismic signals in a digital computer. The broad steps of the invention include reproducing the seismic signal as an electrical signal and then generating from the reproduced seismic signal an electrical control function representative of a smoothed version of the absolute value of the seismic signal. Next, the amplitude of the reproduced seismic signal is dynamically adjusted by amounts related to the inverse of the generated control function.

Preferably the control function is generated by smoothing the absolute value of the reproduced seismic signal with a moving average operator.

BRIEF DESCRIPTION OF THE DRAWINGS

FIGS. 1A–1E are diagrammatic examples waveforms that illustrate the basic steps in the method of the present invention;

FIG. 7 is a diagrammatic example of a digital seismic signal for use in explaining the digital implementation of the present invention.

DETAILED DESCRIPTION OF SPECIFIC EMBODIMENTS

Figure 2:
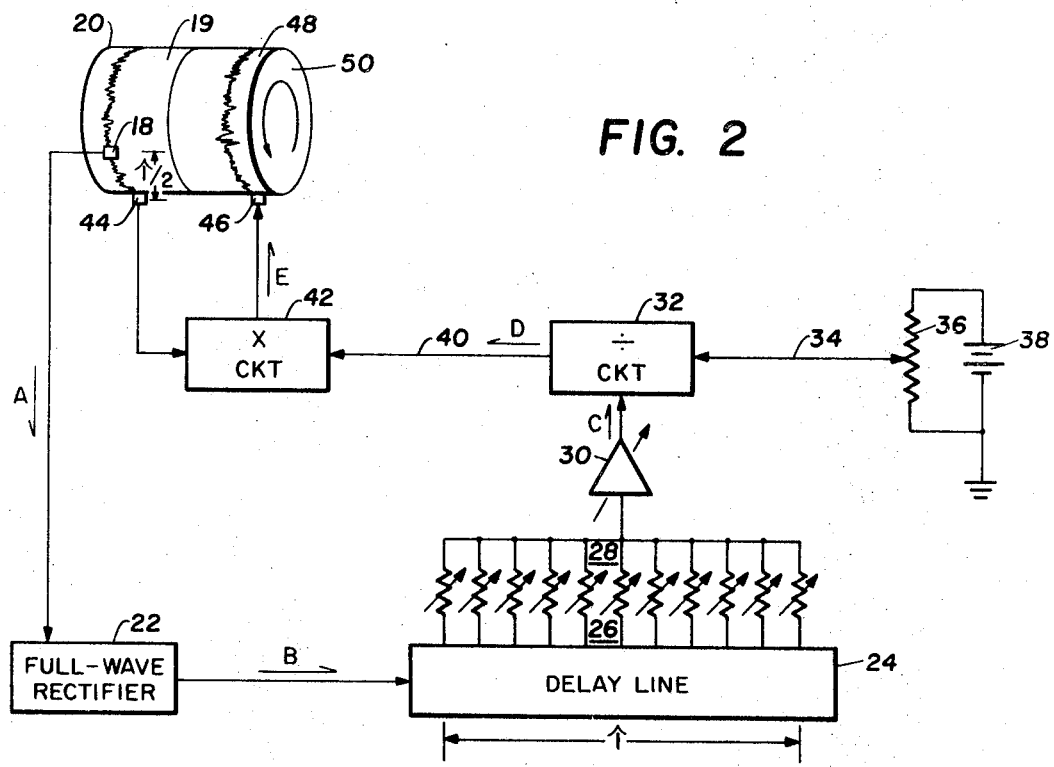
FIG. 2 is a diagrammatic illustration of an analog apparatus for implementing the present invention.

Referring now to FIGS. 1A–1E there is illustrated at A a diagrammatic example of the waveform of an input seismic signal having a broad range of reflection amplitudes. In its early portion over interval 15, which is typically about 1 to 1.5 seconds for a six-second record, the average amplitude is very low. This may be due to the use of an improper programmed gain control function or AVC as mentioned above. Commonly, the low average amplitude level in interval 15 is due to data processing techniques. For example, in the processing of multifold coverage seismic traces in accordance with the common reflection point or "horizontal stacking" technique, the early portions of certain input traces are reduced to zero, or so-called "trace zeroed." When these traces are added together with different beginning times, the resulting composite trace such as trace A has different amplitudes in the range of shallow data because of the "trace zeroing" of the input signals. The average amplitude of the shallow data on the resulting composite trace may be very low compared to the average magnitude on the latter part of the trace. The shallow data is usually needed to map shallow horizons and determine static corrections. Unless corrective measures are taken the shallow data may be lost.

Therefore, in accordance with this invention the input seismic signal A is equalized for all variations in gain other than those due to subsurface geology. The method of the invention can be broken down into the following steps:

*Step 1.*—Reproduce the input signal A.

*Step 2.*—Generate signal B representative of the absolute value or full-wave rectified value of the input signal A.

*Step 3.*—Smooth the absolute value signal B to produce a control function C. The control function C may be also called a smoothed version of the absolute value of the input signal A. Preferably this smoothed version is a moving average which is the average over a progressively shifting interval called the moving average interval or smoothing interval.

*Step 4.*—Find the inverse D of the control function C.

*Step 5.*—Dynamically adjust the amplitude of the input signal A by amounts related to the inverse control function D to produce the equalized output signal at E. This may be accomplished by multiplying input signal A by inverse control function D.

For ease in understanding, the invention was described above with reference to five basic steps. However, certain of these steps may be combined into substantially the same operation. For example, it is not always necessary to produce the entire absolute value signal B to permit generation of the control function C. In one operation, there may be generated a signal representative of a smoothed version of the absolute value of an input seismic signal while the seismic signal is simultaneously being corrected.

ANALOG IMPLEMENTATION

There will now be described an analog implementation of this method of this invention because of the insight that it gives into the principles of the invention. However, the preferred mode of implementing the invention is with an automatic digital computer as will be described in the next subsection.

Referring to both FIGS. 1A–1E and 2, seismic signal A recorded in magnetic form on tape 19 is detected by a pickup head 18 located adjacent a playback drum 20. The electrical signal A detected by pickup head 18 is fed to full-wave rectifier 22. The rectified signal B is then applied to a smoothing filter including a delay line 24, rheostats 28, and a variable gain amplifier 30. The output taps 26 of delay line 24 each represent different time delay intervals. The time length of the delay line 24 is equal to some desired smoothing interval $\tau$ over which it is desired to smooth the input signal A to obtain the control function C.

Figure 3:
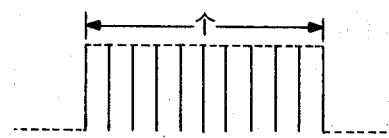
FIGS. 3–5 illustrate various smoothing filter operators for use in the present invention.

The smoothing filter operator used preferably in accordance with this invention is the moving average operator or square pulse illustrated in FIG. 3. Accordingly, each of the rheostats 28 is adjusted to approximately the same value so that the impulse response of the smoothing filter conforms to FIG. 3.

The output of each of rheostats 28 is connected in common to provide a summation signal of the input signal A over the time interval $\tau$. This summation signal is applied to variable gain amplifier 30 to produce electrical control function C. Amplifier 30 compensates for the attenuation caused by rheostats 28 and provides for a divisor factor proportional to the number of output taps 26 (the number of samples over the smoothing interval $\tau$). Control function C from the output of amplifier 30 is applied to one input of a divide circuit 32. The other input to divide circuit 32 is the voltage appearing on line 34 representative of a desired static or constant gain for the equalized seismic signal. The potentiometer 36 connected across a DC supply 38 is adjusted to provide a voltage on line 34 that is proportional to this desired static gain. The voltage on line 34 is divided by control function C from the output of amplifier 30 in divide circuit 32 to provide a correction signal or inverse control function D on output line 40. This inverse control function is applied to one input of a multiplier circuit 42. Applied to the other input of multiplier circuit 42 is the signal detected by a second pickup head 44 mounted on the same track with pickup head 18 to detect the input seismic signal A at a time delay $\tau/2$. This delayed signal is applied to the multiplier circuit 42 where it is multiplied by the inverse control function on line 40. The equalized seismic signal E from the output of circuit 42 is then applied to a record head 46 for recording on a second tape 48 on record drum 50 mounted on the same shaft with playback drum 20.

The pickup head 44 is adjusted to a position to detect the input seismic signal at a time corresponding with $\tau/2$, or half the smoothing interval. This is done because it is preferred to correct the seismic signal at the center of the smoothing interval. The instantaneous signal detected by head 44 corresponds with the signal appearing at the center tap of delay line 24. The smoothing filter then effectively "looks forward" for a time $\tau/2$ and simultaneously "looks backward" for an equal time to obtain the average amplitude over this smoothing interval. The center point within the smoothing interval of the input seismic signal is then corrected based upon what the smoothing filter sees "forward" and "backward" over the intervals $\tau/2$.

In other embodiments of the invention the instantaneous amplitude of the input seismic signal may be corrected at any point over a smoothing interval. For example, the instantaneous part of a seismic signal may be corrected at the end of a smoothing interval. Thus, if it is desired to correct the seismic signal based upon a smoothing interval that only "looks ahead" of the smoothing filter, the pickup head 44 is adjusted further around drum 20 to a point corresponding with the smoothing interval $\tau$. Then the instantaneous value of the input seismic signal detected by head 44 will be corrected based upon the average of the smoothing interval $\tau$ that looks only ahead of the corrected value of the input signal.

In still a further alternative, the instantaneous value of the input signal may be corrected based upon a smoothing interval that looks only "behind" the value being corrected. In this embodiment the pickup head 44 would be located above pickup head 18 by a time corresponding with the smoothing interval $\tau$.

Figure 4:

As described above, the preferred embodiment of the invention employs the smoothing filter operator of FIG. 3. With this smoothing filter operator each component of the seismic signal over the smoothing interval $\tau$ has uniform influence over the corrected value of the seismic signal appearing at the center of the smoothing interval. In other embodiments of the invention, it may be desirable to have a nonuniformly weighted smoothing filter operator. For example, as illustrated in FIG. 4, it may be desirable to have a trapezoidal shaped operator. With the operator of FIG. 4 the components of the seismic signal on either side of the center of the smoothing interval $\tau$ have decreasing influence over the corrected component at the center of the smoothing interval. If the smoothing filter operator of FIG. 4 is to be used, then rheostats 28 are adjusted to correspond with the points on this operator.

Figure 5:

In still another embodiment of the invention the smoothing filter employed may be the ramp function illustrated in FIG. 5. The operator of FIG. 5 is useful where it is desired to correct the component of an input seismic signal in time related to the leading end of the smoothing interval at 50. The sample within the smoothing interval $\tau$ for the operator of FIG. 5 have linearly decreasing influence as time increases away from end 50.

Figure 6:
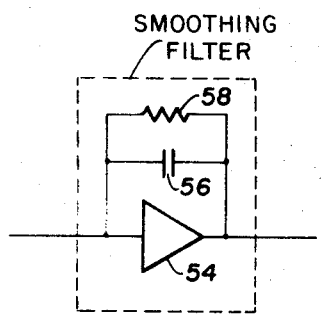
FIG. 6 illustrates an alternate smoothing filter apparatus for use instead of the delay line in FIG. 2.

While a delay line type smoothing filter is preferred for an analog implementation of this invention, because of its ease in changing smoothing filter operators, other types of smoothing filters may be used. For example, the smoothing filter in FIG. 6 may be used. It comprises primarily an integrating amplifier 54 which has sufficient leakage to integrate only over a short interval such as corresponding with the smoothing interval $\tau$ of FIG. 2.

The integrating amplifier 54 has a feedback capacitor 56 which accumulates a charge proportional to the integration of the rectified input signal but a resistor 58 allows enough leakage of the charge from capacitor 56 to provide integration over only a short interval. Thus the smoothing filter operator for the apparatus of FIG. 6 may have a curve-shaped envelope.

In FIG. 2 the delay line 24 may be a lumped constant electronic delay line of any well-known type. The divide circuit 32 and multiplier circuit 42 may be essentially the same circuit such as the one in Figure 6.18*b* on page 281 of Electronic Analog Computers, by Korn and Korn, 2nd edition, 1956, McGraw-Hill Book Company, Inc.

In the analog implemention of the invention as described above, there will be a truncation error as the smoothing filter operator begins operating on the beginning of the input seismic signal and as it leaves the end of the input seismic signal. This error arises because the seismic signal is beginning to be corrected as it is detected by pickup head 44 before the smoothing filter operator of delay line 24 is fully engaged. Thus the gain setting on amplifier 30 will be adjusted to provide for an average over the full length of the smoothing interval $\tau$ but only half of the smoothing filter operator is engaged. Therefore, for a period of time equal to half the smoothing interval $\tau/2$ the correcting gain function applied to multiplier circuit 42 will be too small. The truncation error approaches zero as the smoothing filter operator approaches full engagement. A similar error arises as the smoothing filter operator extends beyond the end of the input seismic signal.

These truncation errors may be ignored if the smoothing interval $\tau$ is small, say on the order of one-half second or less. However, if this error cannot be ignored, various steps may be taken to correct for it. For example, means may be provided to adjust the gain of amplifier 30 in proportion to the amount of the smoothing filter operator engaged with the seismic signal. Another alternative is to extend the end value of the magnetically recorded seismic signal on tape 20 by an amount equal to half the smoothing interval. Thus, when the smoothing operator is engaged only half way it will "see" amplitudes over its entire length.

Each trace on a seismogram may be equalized with the same technique as described above. Thus, the final output seismic cross section comprised of many seismic traces will have the same relative average amplitude among them as well as the same average amplitude within each one of them.

DIGITAL IMPLEMENTATION

The preferred mode for implementing this invention is with an automatic digital computer. Such a computer may be of the general purpose type, such as the Model 6600 available from the Control Data Corporation. The specific peripheral equipment for use with such a computer is largely immaterial.

The following will be a description of the digital implementation of this invention in such detail as to permit a computer programmer of ordinary skill in the seismic processing art to program a digital computer to carry out the invention. This programming may be done in any of the well-known computer programming languages such as Fortran.

As described above, the preferred smoothing operator for use in this invention is the moving average operator illustrated in FIG. 3. Also it is preferred to correct the center sample of the smoothing interval. Use of a uniformly weighted smoothing operator simplifies the processing procedure to a mere addition of samples over a smoothing interval. There need be no multiplication by the smoothing operator since each of the values of the smoothing operator throughout the interval is the same and therefore may be taken as equal to one.

Based upon this preferred embodiment of the invention, the digital implementation may be described by the following equation with reference to FIG. 7:

$$S_i(\text{out}) = S_i(\text{in}) \times \frac{AMP}{\frac{1}{n+1} \sum_{j=i-n/2}^{i+n/2} |S_j|} \quad (1)$$

where:

$S_i(\text{out})$ = Output or corrected value of the center sample of the smoothing interval;
$S_i(\text{in})$ = Input or uncorrected value of the center sample of the smoothing interval;
AMP = Static gain value chosen to yield outputs within a desired average amplitude range;
$n+1$ = Number of samples in the smoothing interval;
$|S_j|$ = Absolute value of the $j$th sample.

Each digital sample $S_i(\text{in})$ of the digital seismic trace of FIG. 7 is corrected by an amount related to the inverse of the average sample amplitude over a smoothing interval. This smoothing interval in time is equal to $\tau$ or $n+1$ samples. For each digital sample $S_i(\text{in})$ the average sample amplitude over the smoothing interval is computed according to the denominator of the second term of Equation 1. This average sample amplitude is divided into a desired static or constant amplitude factor AMP to produce the gain correcting factor for the center sample $S_i(\text{in})$ of the smoothing interval. The correcting factor is multiplied times $S_i(\text{in})$ to find the output sample amplitude $S_i(\text{out})$.

As the smoothing interval is shifted successively down the seismic trace, successive calculations are performed to generate a series of average gain factors. For each successive calculation the earliest sample in the smoothing interval is dropped and the next sample at the leading end of the smoothing interval is added. During each successive calculation each sample $S_i(\text{in})$ of the seismic trace is corrected.

The following is a sample calculation of the correction of the fifth sample $S_5(\text{in})$ with reference to FIG. 7.

Assume: AMP = 3; $i=5$; $n+1=9$. The denominator of the second term of Equation 1 is:

$$\frac{1}{n+1} \sum_{j=i-n/2}^{i+n/2} |S_j| = \frac{1+3+4+5+4+3+|-1-2-1|}{9}$$
$$= \frac{24}{9}$$

Substituting into Equation 1, we have:

$$S_i(\text{out}) = S_5(\text{out}) = S_5(\text{in}) \times \frac{3}{24/9}$$
$$= 4 \times \frac{27}{24}$$
$$S_5(\text{out}) = 4.5$$

The range of normalizing or "trimming" a seismic trace may be all or part of the trace. If the purpose of the trimming is merely to increase the amplitude of shallow data in relation to the amplitude of deeper data on a seismic trace, the smoothing interval is shifted only over the range of the shallow data. A value may be coded into the computer program indicating the value at which the smoothing interval is to stop. At this stopping point it is preferred that the multiplicative correcting factor indicated by the second term of Equation 1 above be applied to the remaining samples of the trace.

The length of the smoothing interval may vary depending upon the purpose for which correction is desired. If it is desired to merely increase the average amplitude of the shallow data in relation to the deeper data, a smoothing interval of 400 or 500 milliseconds may be appropriate. When the method is used for equalizing the gain of the full length of a trace, a smoothing interval of 800 to 1,000 milliseconds may be appropriate. In any case it is preferred that the smoothing interval be not less than about 400 milliseconds for normal seismic traces.

As described above with reference to the analog implementation of the invention, there will be a truncation error when the smoothing filter operator is not fully engaged with the beginning or the end of a seismic trace. For the digital implementation of this invention, it is relatively simple to compensate for this truncation error. The preferred way is to adjust the number of samples used for computing the average sample amplitude according to the number of samples of the operator which is engaged with the seismic trace. For example, at the beginning of the seismic trace only one-half of the smoothing interval would be engaged for correction of the first sample of a seismic trace. Thus, only half the number of samples in the smoothing interval would be used as the divisor for computing the average sample amplitude. Then as the smoothing interval shifted to the next sample increment the divisor used for computing the average sample amplitude would increase by one. This sequential increment of the number of samples in a smoothing interval would continue until the smoothing operator is fully engaged with the seismic trace at which point the divisor for computing average sample amplitude would remain constant at $n+1$ according to Equation 1. If the entire length of a seismic trace is to be equalized, a similar procedure with an incrementally decreasing divisor may be used to correct for truncation error as the smoothing operator extends beyond the end of the seismic trace.

Another technique for correcting for truncation error at the beginning and end of the smoothing operation is the following. The smoothing interval may begin fully meshed with the beginning of the seismic trace. Then the correcting factor for the center sample of the trace over the smoothing interval may be computed and that same correcting factor be applied to all the earlier samples of the seismic trace.

The technique of simultaneously smoothing and correcting as described above is preferred because it is most economical of computing time. In other embodiments of the invention, however, it may be desirable to first store the average gain function (or its inverse) and then to play back the seismic trace and adjust the amplitude according to the inverse of the stored gain function. In still other embodiments of the invention, it may be desirable to correct the traces of a seismogram and then print out or write out a trace representative to the inverse gain function that was applied to each trace of a seismogram (or perhaps selected traces of a seismogram). With such a write-out of the inverse gain correcting function a seismologist could perform gain studies and generally be more cognizant of what had been done to the relative amplitudes on the seismic traces.

Now that several embodiments of the invention have been described, those skilled in the art may imagine still other embodiments within the true spirit and scope of the invention. It is intended to cover all such embodiments as fall within the scope of the appended claims.

We claim:
1. A process for equalizing a seismic data trace for dynamic gain variations other than those due to subsurface geology, said process being performed with an automatic electronic digital computer system having a program control means for controlling the operation of an input unit, an output unit, and an arithmetic unit, said process comprising the step of adjusting said program control means for controlling the operations of:
(a) inputting said seismic data trace into said storage unit through said input unit;
(b) transferring said seismic data trace from said storage unit to said arithmetic unit;
(c) computing in said arithmetic unit the average amplitude of the digital samples of said seismic data trace over a smoothing interval;
(d) computing in said arithmetic unit the corrected amplitude of the center sample in said smoothing interval adjusted by an amount inversely proportional to said average sample amplitude;
(e) storing said corrected sample amplitude in said storage unit;
(f) repeating operations (c), (d), and (e) for said smoothing interval shifted successively by at least one sample increment; and
(g) outputting said corrected amplitudes from said storage unit through said output unit onto a recording medium.

2. A process performed with an automatic electronic digital computer system of the stored program type, comprising the steps of:
(a) generating digital seismic data representative of seismic energy induced at a source point on the earth's surface and received at a detecting point after being reflected from subsurface layers;
(b) smoothing the absolute value of said seismic data with a smoothing operator by computing the average amplitude of the digital samples of said seismic data over a smoothing interval;
(c) computing the amplitude of the center sample of said smoothing interval adjusted by an amount related to the inverse of said computed average amplitude;
(d) successively shifting said smoothing interval by at least one sample increment and repeating steps (b) and (c) for each successive smoothing interval whereby the seismic data is equalized for dynamic gain variations other than those due to subsurface geology; and
(e) storing said equalized seismic data.

References Cited

UNITED STATES PATENTS

| | | | |
|---|---|---|---|
| 2,934,741 | 4/1960 | Gray et al. | 340—15.5 |
| 3,312,933 | 4/1967 | Lawrence et al. | 340—15.5 |

OTHER REFERENCES

Robinson et al.: Principles of Digital Filtering, Geophysics, vol. XXIX, No. 3 (June 1964), pp. 395–404.

RODNEY D. BENNETT, JR., Primary Examiner

C. E. WANDS, Assistant Examiner

PO-1050
(5/69)

UNITED STATES PATENT OFFICE
CERTIFICATE OF CORRECTION

Patent No. 3,518,678          Dated June 30, 1970

Inventor(s) Philip L. Lawrence and Jack T. Nipper

It is certified that error appears in the above-identified patent and that said Letters Patent are hereby corrected as shown below:

Column 1, line 14, "equilizing" should read --equalizing--;
          line 26, "Ser. No. 656,772" should read --Ser. No. 656,722--.
Column 2, line 28, after "examples" insert --of--;
          line 63, "magnitude" should be --amplitude-- and "latter" should be --later--.
Column 3, line 31, "this" (first occurrence) should read --the--.
Column 4, line 65, "sample" should read --samples--.
Column 5, line 14, "implemention" should read --implementation--.
Column 7, line 48, "to" should read --of--.

SIGNED AND
SEALED

SEP 29 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,518,678          Dated June 30, 1970

Inventor(s) Philip L. Lawrence and Jack T. Nipper

It is certified that error appears in the above-identified patent and that said Letters Patent are hereby corrected as shown below:

```
Column 1, line 14, "equilizing" should read --equalizing--;
          line 26, "Ser. No. 656,772" should read --Ser. No.
                   656,722--.
Column 2, line 28, after "examples" insert --of--;
          line 63, "magnitude" should be --amplitude-- and
                   "latter" should be --later--.
Column 3, line 31, "this" (first occurrence) should read
                   --the--.
Column 4, line 65, "sample" should read --samples--.
Column 5, line 14, "implemention" should read --implementation--.
Column 7, line 48, "to" should read --of--.
```

SIGNED AND
SEALED

SEP 29 1970

(SEAL)
Attest:

Edward M. Fletcher, Jr.
Attesting Officer

WILLIAM E. SCHUYLER, JR.
Commissioner of Patents